United States Patent [19]

Loren

[11] Patent Number: 5,039,463
[45] Date of Patent: Aug. 13, 1991

[54] GAS ASSISTED INJECTION MOLDING

[76] Inventor: Norman S. Loren, 24874 Chalk Farm Rd., Warren, Mich. 48091

[21] Appl. No.: 501,147

[22] Filed: Mar. 29, 1990

[51] Int. Cl.[5] .................... B29C 45/00; B29C 45/76; B29C 45/78; B29D 22/00

[52] U.S. Cl. .................. 264/40.3; 264/40.6; 264/328.8; 264/328.12; 264/328.13; 264/572; 425/812

[58] Field of Search ............ 264/40.3, 40.6, 85, 264/328.8, 328.12, 328.13, 500, 572; 425/812

[56] References Cited

U.S. PATENT DOCUMENTS

| | | | |
|---|---|---|---|
| 4,101,617 | 7/1978 | Friederick | 264/572 |
| 4,740,150 | 4/1988 | Sayer | 425/542 |
| 4,781,554 | 11/1988 | Hendry | 425/4 R |
| 4,824,732 | 4/1989 | Hendry et al. | 428/542.8 |
| 4,855,094 | 8/1989 | Hendry | 264/40.3 |
| 4,935,191 | 6/1990 | Baxi | 264/572 |
| 4,943,407 | 7/1990 | Hendry | 264/572 |

FOREIGN PATENT DOCUMENTS

| | | |
|---|---|---|
| 250080 | 12/1987 | European Pat. Off. . |
| 298635 | 1/1989 | European Pat. Off. . |
| 309182 | 3/1989 | European Pat. Off. . |
| 317176 | 5/1989 | European Pat. Off. . |
| 852609 | 7/1949 | Fed. Rep. of Germany . |

*Primary Examiner*—Leo B. Tentoni
*Attorney, Agent, or Firm*—Krass & Young

[57] ABSTRACT

A method and apparatus for gas assisted injection molding. The apparatus includes a bulk storage container; a booster receiving the gas from the bulk storage container and operating to boost the pressure to a relatively high level for delivery to a high pressure storage container; a regulator receiving the gas from the high pressure storage container and reducing the gas pressure to a desired injection pressure; and a control system for injecting the gas into the mold, at the injection pressure as determined by the regulator, thereafter reducing the gas pressure within the mold to a hold pressure, thereafter maintaining the gas in the mold at the hold pressure, and thereafter venting the mold to atmosphere. The apparatus allows the performance of two distinct injection molding methods. In the first method, the regulated gas is injected directly into the mold, is held at the injection pressure during the fill out portion of the molding cycle, and is thereafter reduced to a hold pressure. In the second method, the gas from the regulator is stored in a plurality of fixed volume storage containers and is thereafter injected into the mold from a selected storage container so that, as the gas moves into the expanded volume of the mold during the fill out portion of the molding cycle, the injection pressure is caused to drop to a reduced pressure at which it is held for the duration of the cooling cycle whereafter the mold is vented and the mold opened.

29 Claims, 4 Drawing Sheets

GAS ASSISTED INJECTION MOLDING

FIELD OF THE INVENTION

This invention relates to injection molding and more particularly to gas assisted injection molding.

BACKGROUND OF THE INVENTION

It is desirable in injection molding to urge the molten thermoplastic resin material into contact with the mold surfaces by exerting pressure on the resin. This aids the external surface of the plastic material in assuming the precise shape dictated by the mold surface. The pressure also assists the filling of the mold space with molten resin even if the space is elongated or narrow and is normally difficult to fill.

In gas assisted injection molding, the articles are produced by injecting molten resin into the mold cavity and injecting a quantity of pressurized gas into the resin to fill out the mold cavity and form a hollow portion in the resin. The gas is preferably an inert gas such, for example, as nitrogen. A pressure is maintained on the gas in the hollow gas space within the resin until the resin has sufficiently set, whereafter the pressurized gas is released from the molded part hollow space and the molded part is removed from the mold cavity.

This gas assisted procedure is advantageous since the molded part produced utilizes somewhat less plastic material and is lighter than if the part were solid plastic. More importantly, the plastic in the gas assisted procedure will not have a tendency to shrink away from the mold walls during cooling since the internal gas pressure will keep it pressed against the walls, thereby minimizing or eliminating surface blemishes such as sink marks. Further, the gas assisted procedure eliminates the need to utilize the screw ram of the injection molding machine to pack out the mold during the molding cycle, thereby minimizing or eliminating molded in stresses in the molded part.

Whereas the gas assisted injection molding process offers many advantages, some of which are enumerated above, as compared to injection molding without gas assistance, the known gas assistance processes incorporate several disadvantages. Specifically, prior art gas assisted processes often involve the use of custom made and expensive apparatus and equipment. Further, the prior art gas assisted processes and apparatus often require the use of pressurized oil to perform one or more steps in the process, with the result that system failure may occur when oil mixes with the nitrogen to contaminate the entire system and necessitate expensive repair to the system and attendant production losses, and with the further result that the times required to perform the oil actuated steps in the process are relatively long. Further, the prior art gas assisted processes and apparatus tend to be single purpose in nature and do not address different molding requirements, resin materials, or applications. Further, the prior art gas assisted processes and apparatus do not provide the precise control of the pressure, time and rate parameters required in the process with the result that the parts produced are often unsatisfactory.

SUMMARY OF THE INVENTION

The present invention is directed to the provision of an improved gas assisted injection molding process and apparatus.

More specifically, the present invention is directed to the provision of a gas assisted injection molding process and apparatus which may be readily and carefully controlled to produce a satisfactory molded part in a wide variety of molding applications and utilizing a wide variety of resin materials.

The invention methodology is directed to providing gas assistance in a resin injection molding process of the type in which hot resin is injected into a mold cavity, gas is injected into the resin to fill out the mold cavity, the resin is allowed to set up during a timed cooling cycle, the gas is vented, and the mold is opened to remove the molded part.

According to one aspect of the invention methodology, means are provided to selectively control the pressure of the gas in the mold, the hot resin is injected into the mold cavity, the gas is injected into the mold at a first relatively high pressure as determined by the setting of the control means, the mold cavity is filled out with resin, the gas pressure is reduced to a second lower hold pressure as determined by the setting of the control means, the gas is thereafter maintained by the control means substantially at the lower hold pressure while the resin is setting up, and the gas is thereafter vented before the mold is opened. This precise and fine control of the entire gas assisted molding process, including timing and rate, allows the process to be controlled in such a manner as to produce a quality molded part and allows the parameters of the process to be selectively varied to suit varying molding applications and varying resin materials.

According to a further feature of the invention methodology, a supply of the injection gas is provided and the gas is injected into the mold at a pressure that is at all times below the pressure of the gas supply. This arrangement allows the injection pressure of the gas to be carefully controlled independently of the pressure of the gas supply.

According to a feature of a first embodiment of the invention methodology, the cycle includes an initial cycle portion during which the injected gas acts to fill out the mold cavity with resin, the gas pressure is maintained at the first relatively high pressure during the initial fill out cycle portion, and the gas pressure is thereafter reduced to the lower hold pressure. This arrangement allows the relatively high pressure to be utilized to fill out the mold and thereafter reduces the gas pressure to a lower value to minimize undesirable stresses in the resin following the filling out of the mold.

According to a feature of a second embodiment of the invention methodology, the injected gas pressure is lowered from the first relatively high pressure to the lower hold pressure during the initial fill out cycle portion. According to a further feature of this embodiment of the invention methodology, the gas for injection into the mold cavity is stored as a fixed volume at a pressure that is less than the gas supply pressure. This arrangement allows the gas to enter the mold cavity at a relatively high injection pressure and thereafter drop down in a self-executing manner to the lower hold pressure.

According to a feature of a third embodiment of the invention methodology, the injected gas pressure is reduced from a first relatively high pressure to a lower pressure during the initial fill out portion of the cycle and is thereafter further reduced to a lower hold pressure.

According to a feature of a fourth embodiment of the invention methodology, the injected gas pressure is maintained at a substantially constant pressure during the fill out and hold portions of the molding cycle.

According to one feature of the invention apparatus, the apparatus includes means operative to deliver gas to the mold, to assist in the injection molding process, at a first relatively high pressure, and selectively adjustable control means operative to thereafter lower the gas pressure in the mold to a second lower pressure corresponding to the setting of the control means. This arrangement allows the pressure within the mold to be carefully and precisely controlled during the molding cycle.

According to a further feature of the invention apparatus, the control means is further operative, after lowering the gas pressure in the mold to the lower pressure, to hold the gas pressure at substantially the lower pressure until the mold is vented prior to opening the mold. This arrangement further facilitates the precise and careful control of the gas pressure within the mold during the molding cycle.

According to a further feature of the invention apparatus, the control means includes a pressure relief valve selectively adjustable to determine the magnitude of the lower hold pressure of the gas.

According to a further feature of the invention apparatus, the control means further includes a control valve cooperating with the relief valve and means for selectively opening the control valve to allow the relief valve to function to lower the gas pressure to the second lower pressure as determined by the setting of the relief valve.

According to a further feature of the invention apparatus, the control means further includes a flow valve cooperating with the control valve for controlling the rate of gas flow through the control valve.

According to a further feature of the invention apparatus, the apparatus includes a source of gas; high pressure storage means for storing a supply of the gas at a first high pressure; pressure regulator means downstream of the high pressure storage means for reducing the gas pressure to a second lower pressure; a fixed volume storage system downstream of the pressure regulator including at least one fixed volume storage container for storing a fixed volume of gas at the second pressure; and control means for delivering gas to the mold, to assist in the injection molding process, selectively either directly from the pressure regulator, bypassing the fixed volume storage container, or from the fixed volume storage container. This arrangement allows the gas to be directed to the mold, depending upon the particular application, either directly from the pressure regulator or from the fixed volume storage system.

According to a further feature of the invention apparatus, the fixed volume storage system includes a plurality of fixed volume storage containers of various volumes so as to deliver gas to the mold in selected quantities, depending on the fixed volume container employed.

According to a further feature of the invention apparatus, the fixed volume storage system comprises at least one container of variable volume so that the volume of the container may be selectively varied to deliver a selected quantity of gas to the mold depending on the molding requirements.

According to a further feature of the invention apparatus, the control means is selectively operable to maintain a substantially constant pressure during the fill out and hold portions of the molding cycle.

DETAILED DESCRIPTION OF THE PREFERRED EMBODIMENT

Figure 1A:
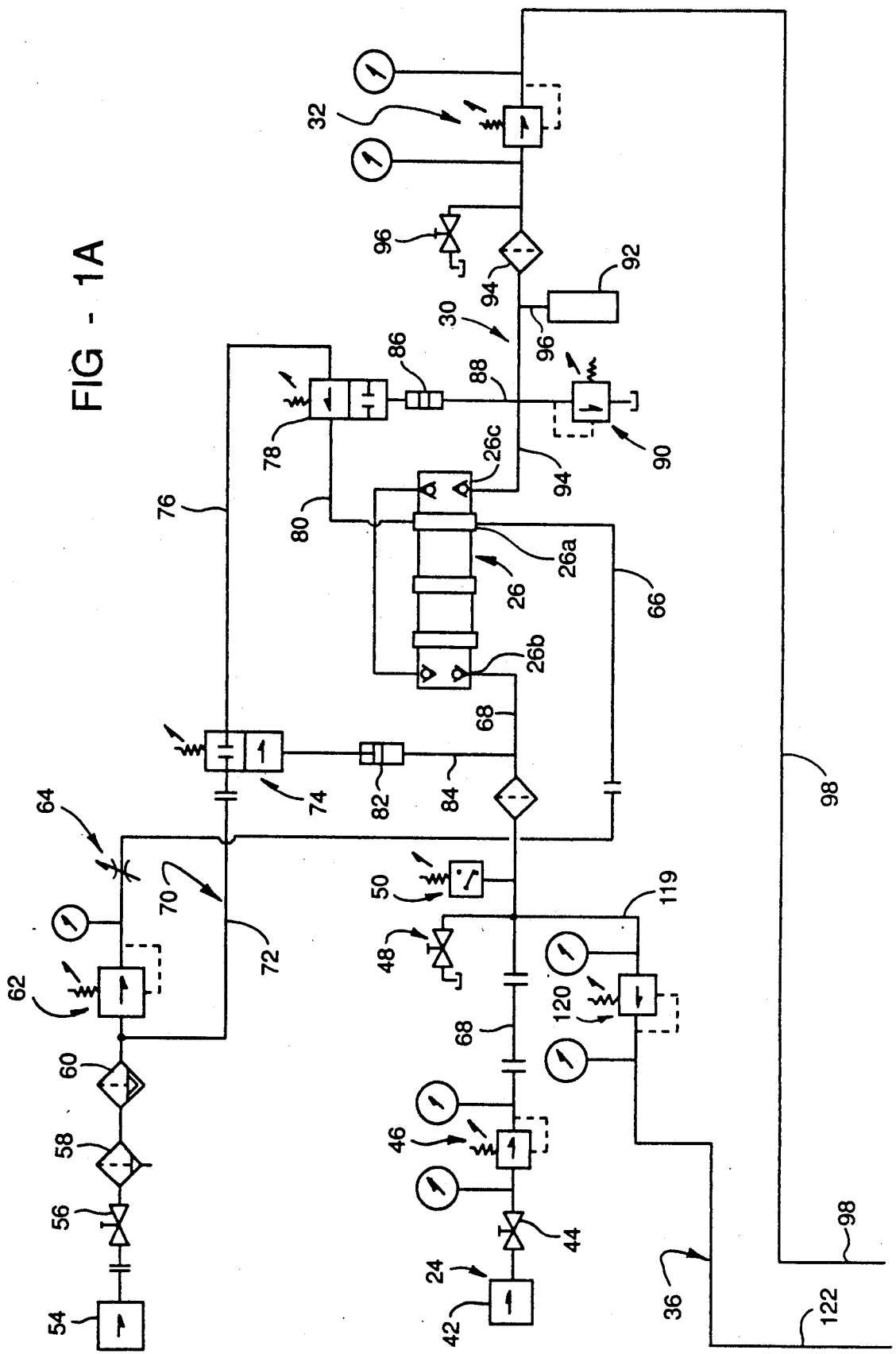
FIGS. 1A and 1B are flow diagrams illustrating the invention method and apparatus.

The invention gas injection apparatus and methodology is intended for use in association with a gas assisted injection molding process of the type in which hot resin is injected into a mold cavity, gas is injected into the resin to fill out the mold cavity with resin, the gas is held at a pressure while the resin sets up, the gas is vented from the mold, and the mold is opened to remove the molded part. The gas may be injected into the mold through the same nozzle used to inject the hot resin or, alternatively, may be injected into the mold at a location separate from the interface between the resin nozzle and the mold, for example the sprue, the runner, or directly into the mold cavity.

In the method and apparatus illustrated in FIG. 1, the gas is introduced into the mold through the resin injection nozzle. Specifically, the gas is introduced into an injection nozzle 10 connected in known manner to an injection molding machine 12 and including a screw or plunger (not shown) which is actuated in known manner to force resin through nozzle outlet 14 so as to inject a quantity of hot resin 16 into a mold cavity 18 defined, for example, by first and second mold halves 20 and 22. The quantity of resin injected is a "short shot", i.e., less than the amount required to totally fill the mold cavity 18. Following the introduction of the resin into the mold cavity, and according to known gas assisted molding techniques, pressurized gas is introduced into the mold through the nozzle aperture to fill out the mold cavity with resin. The part to be molded will typically have thicker and thinner portions and the thicker portions will act as an internal runner system to define a flow path for the nitrogen. Since the thicker portions have a significantly higher resin melt temperature, the gas will follow the path of least resistance and the resin material in the thicker portions will continue to flow by virtue of the gas pressure so as to fill out the mold with the resin. Gas pressure is maintained within the mold in the hollow portion of the part until such time as the cooling cycle for the part is sufficient and the resin material has cured, whereafter the gas pressure is suitably vented and the mold is opened to remove the part. The present invention provides an improved method and apparatus for selectively controlling the gas delivered to the mold with respect to pressures, volumes and times in a manner to allow the invention apparatus and methodology to be utilized to produce a superior molded part in a wide variety of molding applications and utilizing a wide variety of resin materials.

The invention gas supply apparatus, broadly considered, includes a bulk supply system 24; a booster system 26; a booster drive system 28; a high pressure storage system 30; a regulator 32; a fixed volume storage system 34; a pilot operated gas system 36; a control system 38; and a gas injection line 40.

Bulk supply system 24 comprises a bulk storage container 42, a shut off valve 44, a pressure regulator with pressure gages 46, a shut off valve 48, a pressure switch 50, and a gas filter 52. Container 42 may comprise, for example, a commercial nitrogen bottle storing nitrogen at a nominal pressure of 2500 psi and pressure regulator 46 may be set, for example, to maintain an output pressure of 400 psi. Shut off valve 48 is utilized to vent the supply line for maintenance purposes. Pressure switch 50 is utilized to provide a warning that the bulk supply pressure has fallen near to the maintained output pressure and needs to be replenished.

Booster 26 is an air driven two stage apparatus of known form, such, for example, as is available from Haskell Co. of Burbank, Calif. as Part No. AGT-62/152C.

The air to drive booster 26 is provided by booster drive system 28. Booster drive system 28 includes a compressed air supply 54, such, for example, as shop air; a shut off valve 56; a manual drain filter 58; an automatic drain filter 60; a pressure regulator with pressure gage 62; and a flow control valve 64. Compressed air supply 54 may be maintained at a pressure of 150 psi and pressure regulator 62 may be set to maintain an output pressure of, for example, 100 psi. Regulator air at 100 psi is delivered through flow control valve 64 and conduit 66 to the air inlet 26a of booster 26 so as to drive the booster in known manner and increase the pressure of the nitrogen supplied via conduit 68 from bulk supply system 24 to the inlet 26b of the booster from the 400 psi setting maintained by regulator 46 to, for example, a pressure at booster nitrogen outlet 26c of 14000 psi.

Booster drive system 28 further includes a pilot air system 70 to shut off the supply of drive air to the booster 26 (utilizing internal booster valve means, not shown) if the output or boost pressure of the booster exceeds a predetermined maximum value (for example 14000 psi) or if the pressure of the nitrogen gas being delivered to the inlet of the booster from the bulk supply system 24 falls below a predetermined value (for example 400 psi).

Pilot air system 70 includes a conduit 72, a two way normally closed gas pilot valve 74, a conduit 76, a two way normally open gas pilot valve 78, and a conduit 80. Valve 74 is actuated by a pilot actuator 82 to an open position and is in communication with nitrogen from bulk supply 24 via a line 84. Valve 74 includes bias means which are set to close the valve 74 at such time as the pressure of nitrogen gas from the bulk supply drops below, for example, 400 psi so as to shut off the supply of drive air to the booster 26 through the internal booster valve means.

Valve 78 is controlled by a pilot actuator 86 which is actuated by nitrogen pressure delivered to the actuator via a conduit 88 and acts in response to nitrogen pressure in conduit 88 in excess of the selected boost pressure (for example, 14000 psi) to close valve 78 and shut off the supply of drive air to the booster through the internal booster valve means. Valve 78 includes bias means which are set to open valve 78 to recycle the booster.

High pressure storage system 30 includes a safety relief valve 90 set to open, for example, at 14500 psi; a high pressure storage container 92 in communication with the outlet of booster 26 via lines 94 and 96; a filter 94; and a shut off valve 96 for venting the system for maintenance purposes.

Pressure regulator 32 receives high pressure nitrogen from high pressure storage system 30 and reduces the pressure of the nitrogen to a pressure suitable for injection into the mold cavity, such, for example, as 6000 psi. A conduit 98 connects the outlet of regulator 32 to fixed volume storage system 34.

Fixed volume storage system 34 includes a plurality of fixed volume storage containers 100, 102 and 104 of various sizes each connected to a conduit 106 by a shut off valve 108. Depending on the volume of gas required for the particular molding application, the containers 100, 102 and 104 may be used individually or in combination. Alternatively, the fixed volume containers 100, 102 and 104 may be replaced by a single variable volume container 110 connected to line 106 by a line 112 and including a screw 114 driving a piston 115 so as to selectively control and vary the volume 116 defined within the container 110 in response to selective rotation of screw 114 by a suitable hand tool or suitable power means.

A conduit 117 communicates with conduit 98 and bypasses fixed volume storage system 34 so that gas from regulator 32 may be delivered directly to a conduit 118 in those molding applications where it is not desired to utilize the fixed volume storage system 34.

Pilot operated gas control system 36 includes a conduit 118 connected to conduit 68 of bulk supply system 24; a regulator 120 set, for example, to reduce the bulk supply pressure of 400 psi to 150 psi; a conduit 122; a conduit 124 communicating with the pilot actuator 126 of a two way normally closed gas pilot valve 128 positioned in conduit 106; a conduit 130 communicating with the pilot actuator 132 of a two way normally closed gas pilot valve 134 positioned in conduit 114; a conduit 136 communicating with the pilot actuator 138 of a two way normally closed pilot valve 140 positioned in conduit 118; a conduit 142 communicating with the pilot actuator 144 of a two way normally closed gas pilot valve 146 positioned in a conduit 148 connected to conduit 118; and a conduit 150 communicating with an pilot actuator 152 of a two way normally closed gas pilot valve 153 positioned in a vent conduit 154. Vent conduit 154 communicates with a conduit 155 connected to conduits 118 and 148.

The invention apparatus further includes a flow control valve 156 in conduit 118; an adjustable relief valve 157 in conduit 148 upstream of valve 146; a flow control valve 158 in conduit 148 downstream of valve 146; a flow control valve 159 in conduit 154 downstream of valve 153; and a pressure gage 160 in conduit 155. Flow control valves 156, 158, and 159 are utilized to control the flow rate of the gas during injection and during subsequent pressure reductions; relief valve 157 functions to adjustably set the desired reduction and hold pressure within the mold; and pressure gage 160 functions to monitor the gas pressure during the various aspects of the molding cycle.

Venting lines 148 and 154 may be connected by suitable apparatus to bulk storage containers to recover a portion of the gas utilized during the process. Although the gas usage is relatively minor and inexpensive, economies of operation can be realized by recovering at least some of the gas utilized in the gas assisted injection molding operation.

Control system 38 includes a control panel 161; a three way solenoid operated control valve 162 positioned in conduit 124 and connected to control panel 160 via a lead 164; a three way solenoid operated control valve 166 positioned in conduit 130 and connected to control panel 160 via a lead 168; a three way solenoid operated control valve 170 positioned in conduit 136 and connected to control panel 160 via a lead 172; a three way solenoid operated control valve 174 positioned in conduit 142 and connected to control panel 160 via a lead 176; and a three way solenoid operated control valve 178 positioned in conduit 150 and connected to control panel 160 via a lead 180.

Control panel 161 contains various selector switches, timers, push buttons, and interface signals with the molding machine to carry out the methodologies of the invention. Control panel 161 includes automatic and manual modes for set up of process and production cycling. The timers control the precise sequence of events.

It will be understood that the control panel receives signals from the molding machine such that the gas can be introduced at a time prior to the completion of the short shot, or at a time after the completion of the short shot. The event is fully adjustable to cover the wide variety of molding applications and resin materials.

Injection line 40 is connected at one end via a coupling 182 to conduit 158 and is connected at its other end to the inlet of injection nozzle 10 so as to allow the introduction of nitrogen gas into the nozzle 10 for providing gas assist to the molding operation in the manner previously described. Alternatively, line 40 may be connected at any other point in the mold in accordance with known gas assisted molding techniques.

The described apparatus, with the exception of the variable fixed volume container 110, utilizes commercially and readily available components. For example, pressure regulator 32 may be of the type available from Tescom of Elk River, Minn. as Part No. 26-1000; the various two way air pilot valves may be of the type available from Swagelok of Solon, Ohio as Part No. SS-445-FP-C; the various three way solenoid operated control valves may be, for example, of the type available from Automatic Switch Co. of Florham Park, N.J. as Part No. 8321A1; and the remaining components in the system may comprise readily available standard shelf items.

Operation

In operation, nitrogen gas is delivered from the bulk supply 24 to the regulator 46 at a stored pressure which may, for example, range from 2500 psi to 400 psi with the pressure dropping as the nitrogen supply is used up. Regulator 46 functions to reduce the pressure and maintain the pressure at 400 psi for delivery to the inlet of the booster 26 wherein the nitrogen pressure is boosted in two stages and in known manner to a selected value of, for example, 14000 psi at booster outlet 26c. The booster is driven by compressed air from air supply 54 and pilot air from pilot air system 70 is utilized via valve 74 to shut off the drive air supply if the pressure of the gas being delivered to the booster drops below 400 psi (indicating a depletion of the supply of nitrogen in the bulk container 24 below the desired level) and via valve 78 to shut off the drive air if the pressure of the nitrogen leaving the booster exceeds the selected 14000 psi.

The high pressure nitrogen leaving the booster is stored in high pressure storage container 92 and is delivered to the inlet of regulator 32 where the pressure is reduced to a selected value of, for example, 6000 psi for delivery to the injection molding apparatus.

The path or manner in which the 6000 psi nitrogen is delivered to the mold will depend upon the particulars of the contemplated molding operation. In general, if the resin being employed in the injection molding operation comprises a material that is relatively difficult to flow and of relatively high molecular weight (such, for example, as a polycarbonate or a polyester alloy), the nitrogen is injected into the gas injection nozzle via lines 117, 118, 155 and 40 (bypassing the fixed storage system 34) to maintain a relatively high pressure during fill out; and if the resin comprises a material which is relatively easy to flow and of relatively low molecular weight (such, for example, as a polypropylene copolymer) but yet requires a relatively high pressure to break through a restriction such as a sub-gate, the nitrogen is delivered to the gas injection nozzle from one of the fixed volume containers of the fixed volume storage system 34.

In either event, whether the gas is delivered directly to the gas injection nozzle via the bypass 114 or is delivered to the gas injection nozzle from the fixed volume storage system 34, gas is delivered to the gas injection nozzle and thereby to the mold at a pressure (for example, 6000 psi) that is at all times during the gas injection cycle lower than the pressure of the gas in the storage container 92 so that the injection pressure of the gas may be carefully and precisely controlled without regard to the storage pressure and independently of the storage pressure, whereafter the gas is reduced to a holding pressure (for example 1000 psi) during the cooling cycle, whereafter the gas is vented to atmosphere and the mold is opened to remove the molded part.

Figure 2:
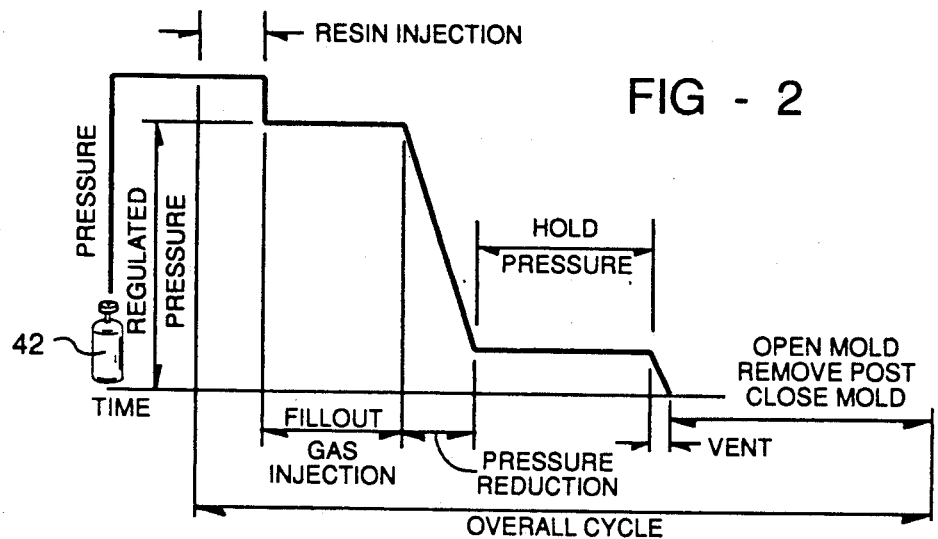
FIGS. 2, 3, 4 and 5 are graphs illustrating the steps in various methodologies that may be practiced according to the invention.
Figure 3:
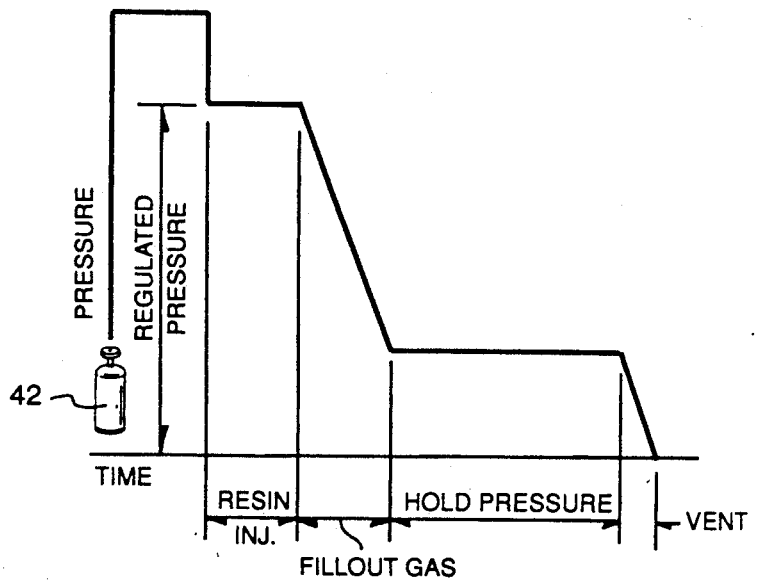
Figure 4:
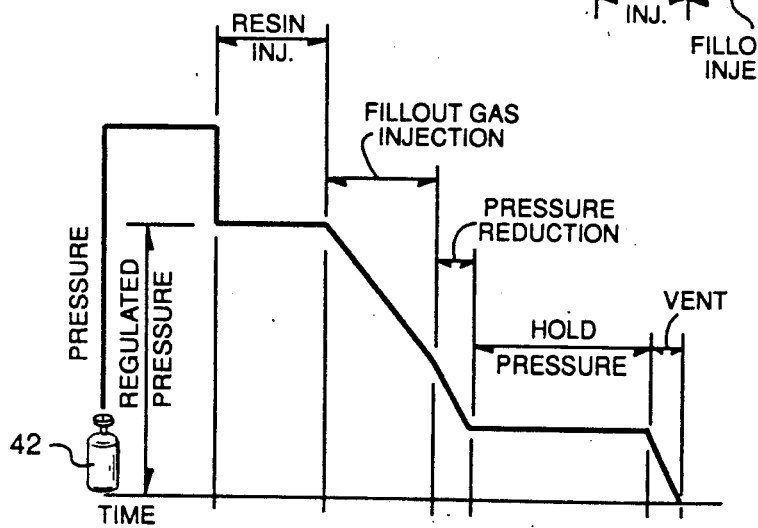

The specifics of the methodology steps employed using the direct injection through line 117, and using the fixed volume injection from fixed volume storage system 34 are shown respectively in FIG. 2, and in FIGS. 3 and 4. It will be understood that the specific methodology employed in any given molding application is determined by selective switch modes provided by control panel 161.

With reference first to FIG. 2, which shows the methodology when the nitrogen is injected directly into the gas injection nozzle bypassing the fixed volume storage system 34, gas from bulk supply regulator 46 at 400 psi is delivered to the booster 26 where it is boosted to 14000 psi; the gas is stored at 14000 psi in container 92; following the resin injection cycle (which may last, for example, between 2 and 4 seconds) or superimposed upon the resin injection cycle, nitrogen is injected into the gas injection nozzle at a pressure of 6000 psi as determined by regulator 32; the gas is held at the 6000 psi injection pressure for a period of time to allow filling out of the mold with the gas creating a hollow within the resin part to press the resin material against the walls of the cavity; the pressure of the nitrogen in the mold is gradually reduced to a lower holding pressure of 1000 psi; the gas is maintained at the holding pressure of 1000 psi during the cooling cycle of the resin; and the gas is thereafter vented to atmosphere to allow opening of the mold and removal of the molded part. For example, the fill out time during which the gas is maintained at 6000 psi may last one second; the time required to gradually reduce the pressure from 6000 psi to 1000 psi may last 5 seconds; the hold time during which the gas pressure is maintained at 1000 psi may last 21 seconds; and the venting cycle may last 2 seconds. The controlled rate of pressure reduction following fill out and during venting prevents resin from contaminating the conduits and valves, as might occur with rapid pressure reduction.

At the beginning of the injection cycle depicted in FIG. 2, valves 128, 140, 146 and 153 are maintained in a closed disposition and valve 134 is maintained in an open disposition by the respective solenoid valves controlled by control panel 161 and relief valve 157 is set at 1000 psi. To begin the gas injection cycle, control panel 161 functions via injection molding machine interfaces, timer sequence, and the appropriate solenoid to open the valve 140 and deliver gas at 6000 psi to the mold cavity whereafter, following a fill out time of, for example, one second, control panel 161 operates through the appropriate timers and solenoid valves to close valve 140 and open valve 146 to allow the regulating relief valve 157 in conduit 148 to gradually reduce the pressure within the resin to the relief valve setting of 1000 psi over, for example, a 5 second period, whereafter control panel 161 functions, after a hold time of, for example, 21 seconds, to signal the appropriate solenoid valve to open valve 153 to vent the gas in the mold chamber to atmosphere via vent line 154. The sequence is reset, for example, when the mold is opened.

With reference to FIG. 3, which shows the methodology when the nitrogen gas is delivered to the gas injection nozzle from one of the fixed volume storage containers of the fixed volume storage system 34, the nitrogen gas is delivered from the bulk supply 24 at the 400 psi regulator pressure to the booster 26 where the pressure is boosted to 14000 psi and stored at that pressure in container 92. At the conclusion of the resin injection cycle, or superimposed upon the resin injection cycle, gas is injected at 6000 psi into the mold cavity from the selected fixed volume storage container 100, 102, 104 and allowed to gradually drop, in a self executing manner by virtue of the volume added downstream of the gas injection valve 140, including the conduit volume and the mold cavity volume, to a hold pressure of 1000 psi, whereafter the gas pressure is maintained at substantially 1000 psi for a time sufficient to allow cooling of the resin part, whereafter the gas is vented to atmosphere and the mold opened to allow removal of the part. For example, the fill out portion of the gas injection cycle may last one second, the hold portion may last 26 seconds, and the vent portion may last 2 seconds.

Figure 1B:
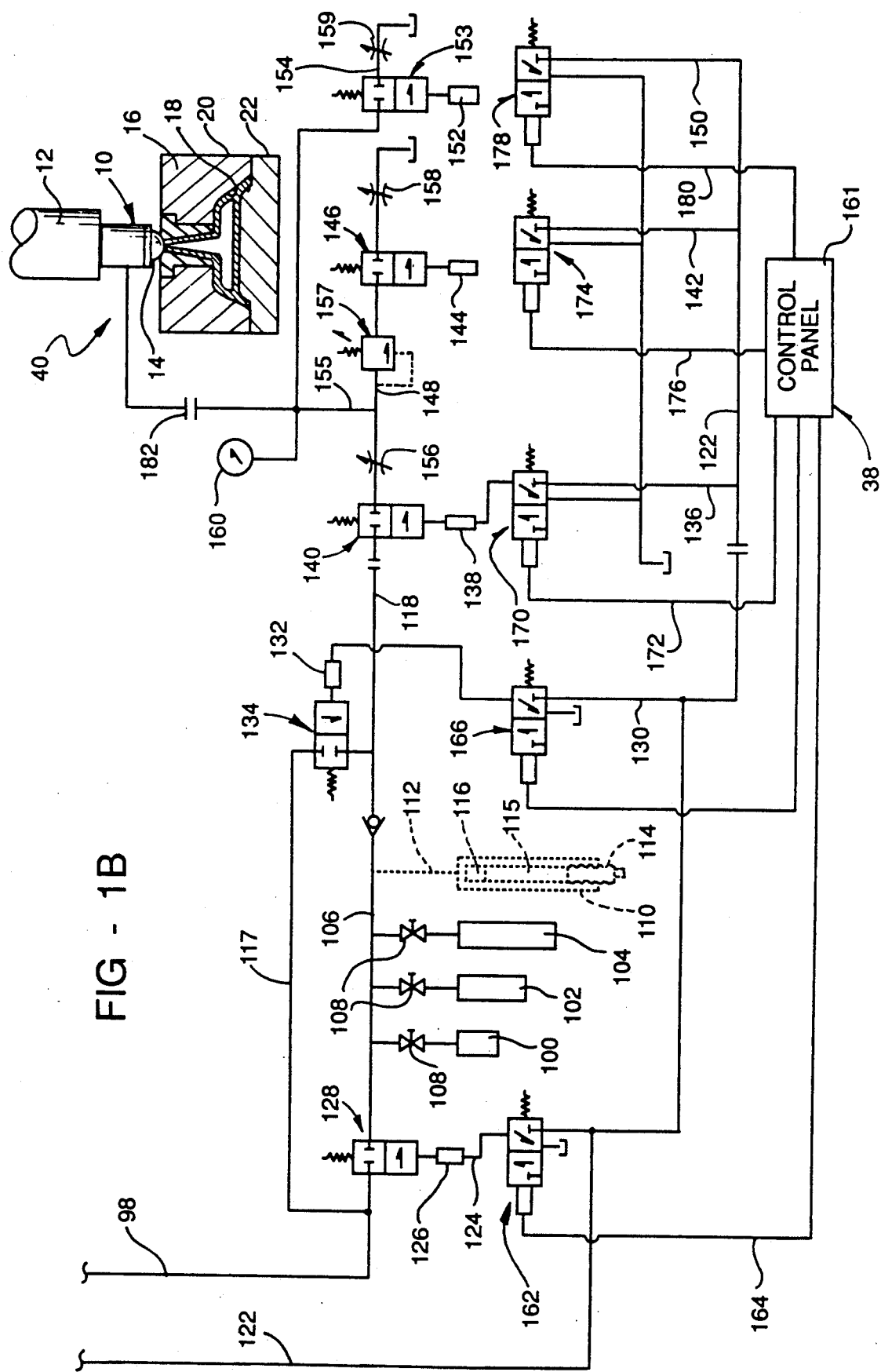

To carry out the methodology of FIG. 3 utilizing the apparatus of FIGS. 1A and 1B, control panel 161 functions to close valves 134, 140, and 153 (with valve 146 remaining in its normally closed position) while opening valve 128 and the selected shut off valve 108 to allow filling of the selected fixed volume container 100, 102 and 104 with nitrogen at 6000 psi as determined by regulator 32; valve 128 is shut; control panel 161 operates to open valve 140 to deliver gas from the chosen storage container to the mold with the gas pressure starting initially at 6000 psi and then, by virtue of the added volume downstream of valve 140, dropping off in a self executing manner to a lower pressure; control panel 38 thereafter functions to close valve 140; and thereafter, following a suitable hold time in which the molded part is cooling, control panel 161 functions to open valve 153 and allow venting of the mold cavity via vent line 154.

In the use of the variable volume container 110, the methodology shown in FIG. 3 is employed and the volume 118 defined by the container 110 is selectively varied by selective turning of screw 115 to provide a fixed volume storage quantity at 6000 psi commensurate with the needs of the particular molding operation.

The methodology shown in FIG. 4 comprises a variation on the methodology shown in FIG. 3 and, as with the methodology of FIG. 3, utilizes the fixed volume storage system 34 to provide the gas to assist the molding process. However, in the methodology of FIG. 4, the injected gas pressure is reduced from the first relatively high injection pressure to a lower pressure during the initial fill out portion of the molding cycle and is thereafter further reduced to a third holding pressure. This is accomplished by selecting the fixed volume of gas to be injected into the mold such that the gas pressure does not drop down fully to the desired hold pressure during the required fill out time but rather is reduced to the desired hold pressure after the fill out time by opening the control valve 146 at the conclusion of the fill out time to allow gas to escape from the mold through relief valve 157 and allow the relief valve to determine the hold pressure in accordance with the adjustable setting of the relief valve. The methodology of FIG. 4 is employed when the reduction in pressure from the high injection gas pressure to a lower pressure is desirable during the fill out of the mold, in a self executing manner, but the lower pressure is higher than the desired hold pressure.

Figure 5:
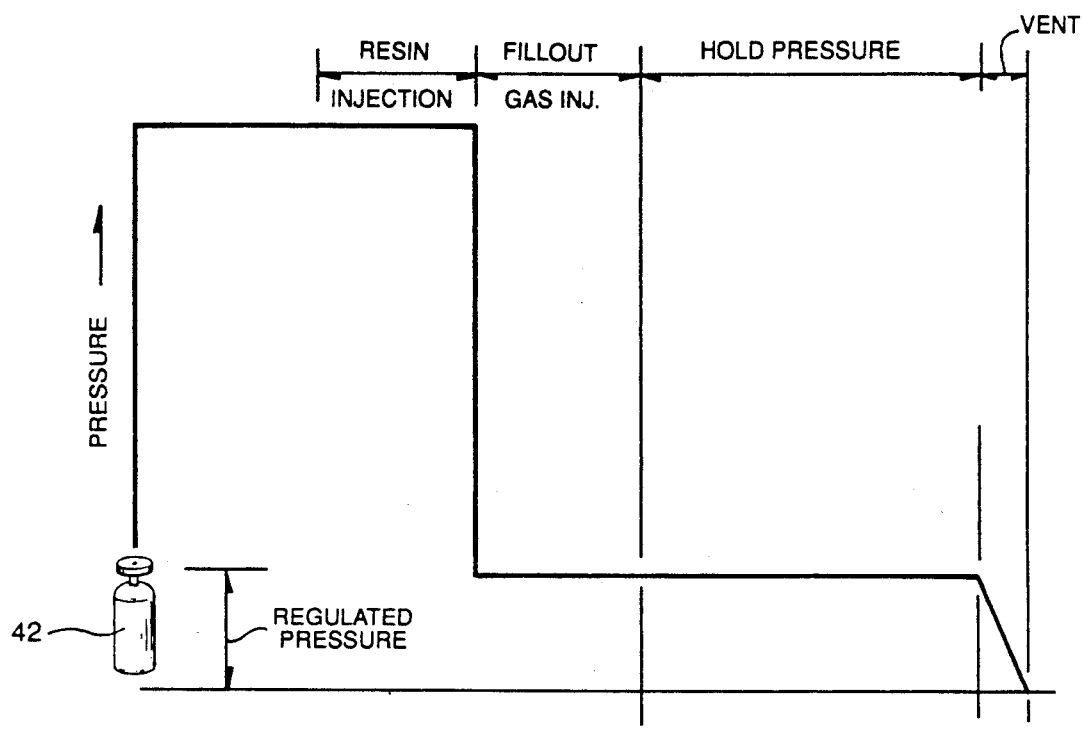

The methodology illustrated in FIG. 5 utilizes gas directly from regulator 32 and operates to maintain the injected gas pressure at a substantially constant value during the steps of fill out and hold. For example, regulator 32 may be set at a relatively low pressure of 1000 psi and the system functions to maintain the 1000 psi pressure in the mold during the fill out and hold portions of the cycle. In carrying out this methodology, control panel 161 functions to make control valve 146 inoperable so that control valve 146 and relief valve 157 play no part in determining the pressure within the mold during the mold cycle.

It will be apparent that the selective injection gas pressure control afforded by the invention apparatus makes possible a further methodology, not specifically illustrated, in which gas directly from regulator 32 is introduced to the mold at 6,000 psi, is held at that pressure for an initial portion of the fill-out cycle, and is thereafter, by appropriate operation of relief valve 157 and control valve 146, allowed to reduce to the hold pressure of 1,000 psi during the remainder of the fill-out cycle.

In cases of extreme gas volume injection requirements, the control panel may be designed to permit the use of both gas from the fixed volume gas storage system 34 and directly from the regulator 32. In the normal fixed volume mode, control valves 128, 134 and 146 are closed and valve 140 is thereafter opened to begin the delivery of gas from the selected container of the fixed volume storage system 34. Valve 128 is opened at a later time with valve 140 closed to replenish the fixed volume storage containers. In the extreme gas volume requirement situation, valve 128 may be opened for a timed period when valve 140 is open to permit the use of the gas from the regulator 32 to supplement the gas from the fixed volume storage system 34.

Although the various methodologies have been described utilizing the venting valve 153 to vent the mold cavity, alternatively, the control panel 161 may be programmed to make venting valve 153 selectively inoperable and the gas may be vented to atmosphere by other means well known in the art.

Figure 6:
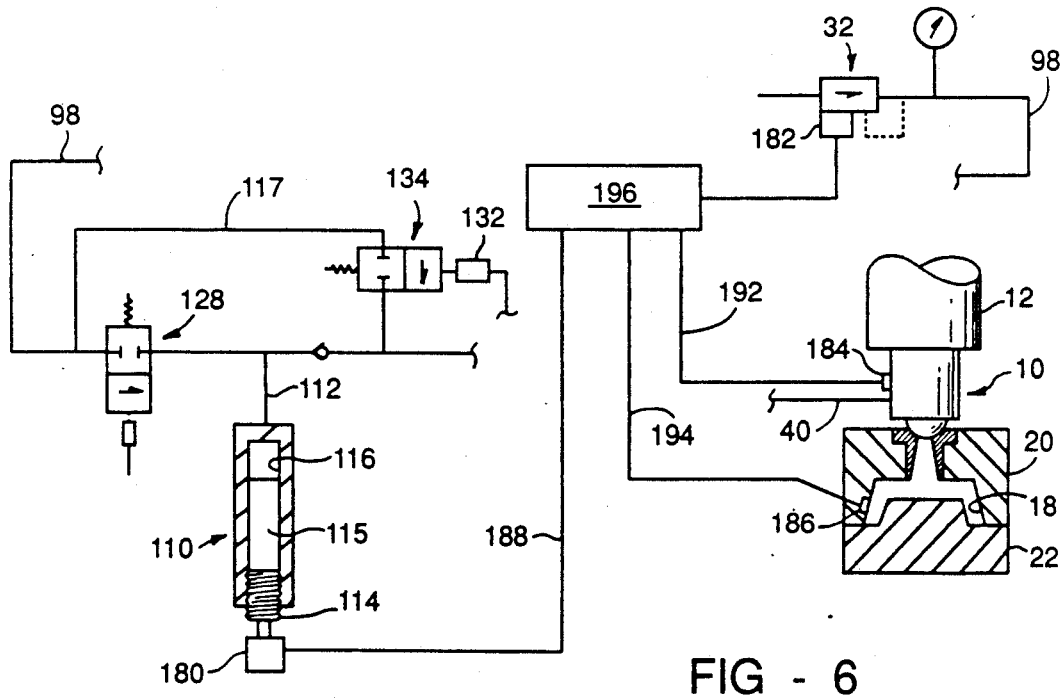
FIG. 6 is a fragmentary view of a modified form of the invention method and apparatus.

The modified form of the invention method and apparatus shown in FIG. 6 is identical to the method and apparatus shown in FIGS. 1A and 1B with the exceptions that the fixed volume storage system 34 comprises a variable volume container 110 and means are provided to selectively vary the volume of the container 110 and/or the setting of pressure regulator 32 in response to sensed conditions or parameters of the injection molding operation. For example, an electric motor device 180 may be provided to drive the screw 115 of container 110; an electric motor device 182 may be provided to drive regulator 32; a thermocouple 184 is positioned to sense the temperature of the resin in the nozzle 10; a further thermocouple 186 is positioned to sense the temperature of the resin in the mold cavity 18; and motors 180 and 182 and thermocouples 184 and 186 are connected respectively by leads 188, 190, 192 and 194 to a control panel 196 which functions to process the information received from thermocouples 184 and 186 and vary the position of piston 115 of container 110 and/or the setting of regulator 32 in response to the information provided via leads 192 and 194 from thermocouples 184 and 186.

For example, control panel 196 may be programmed in response to a sensed drop in temperature, either in the injection nozzle or in the mold, to increase the pressure setting of regulator 32 so as to provide a higher injection gas pressure to overcome the increased viscosity corresponding to the lower temperature. Alternatively, control panel 196 may function in response to the received lower temperature signal from thermocouple 184 and/or 186 to actuate motor 180 in a sense to increase the volume 118 defined within container 110 so as to provide an additional quantity of gas for injection in compensation for the increased viscosity represented by the temperature drop. Conversely, controller 196 may function in response to a sensed increase in temperature at thermocouple 184 and/or 186 to lower the setting of regulator 32 in compensation for the lower viscosity represented by the increased temperature in the mold and/or in the mold cavity, or motor 180 may be actuated in a sense to decrease the volume of chamber 118 in container 110, also in compensation for the lower viscosity represented by the sensed increased temperature.

With the method and apparatus of FIG. 6, the setting of pressure regulator 32 may be selectively varied in response to changes in the molding temperature so as to vary the pressure at which the gas is delivered to the mold via conduits 98, 114, 116, 155 and 40, bypassing fixed volume container 110, or in those situations where it is desired to utilize the fixed volume container to provide the gas to the mold, the setting of the pressure regulator 32 may be varied in response to sensed changes in the temperature at the mold so as to vary the pressure of gas delivered to the container 110; the volume setting of the container 110 may be varied, utilizing motor 180, in response to sensed temperature changes so as to vary the volume of gas delivered to the mold from the fixed volume container; or both the setting of regulator 32 and the volume defined by container 110 may be varied in response to the sensed temperature changes so as to vary both the pressure and the volume of the gas delivered to the mold. Control panel 196, depending upon the characteristics of the molding environment, may comprise a portion of or be integrated with control panel 161; may comprise a portion of or be integrated with the controls of the injection molding machine; or may comprise a stand-alone control panel.

Although the method and apparatus of FIG. 6 have been described utilizing temperature as the sensed condition or parameter of the resin, other conditions or parameters of the resin, such as resin pressure, may also be sensed as, for example, by pressure transducers associated with the injection nozzle and/or the mold cavity.

The described method and apparatus will be seen to provide many advantages with respect to gas assisted injection molding. Specifically, the described system isolates the stored gas pressure from the pressure of the injected gas so as to allow the pressure of the injected gas to be controlled selectively and independently of the high pressure stored gas; the selective control of the gas pressure allows the gas to facilitate the filling out of the mold cavity during the initial portion of the gas cycle and thereafter allows the gas pressure to be reduced and held at a lower level so as to minimize disturbance of the molded material and minimize molded in stresses in the molded part; the different molding techniques offered by the invention apparatus as well as the selected control of the various steps of the method techniques allows the invention apparatus to be utilized to process a wide variety of plastic articles, molds and resin materials in common use; the invention apparatus utilizes standard commercially available shelf components so as to minimize the initial cost of the apparatus and minimize maintenance costs; the invention method and apparatus avoids the use of oil as the drive means so as to avoid the system failure problems associated with mixing of the drive oil with the nitrogen gas; and the invention method and apparatus in general facilitate the greater utilization of gas assisted injection molding techniques and the many benefits that accrue from the utilization of gas assisted injection molding.

Whereas preferred embodiments of the invention have been illustrated and described in detail, it will be apparent that various changes may be made in the disclosed embodiments without departing from the scope or spirit of the invention.

I claim:

1. A method of providing gas assistance to a resin injection molding process of the type in which hot resin is injected into a mold cavity, gas is injected into the resin to fill out the mold cavity, the resin cools, the gas is vented, and the mold is opened to remove the molded part, the improvement wherein means are provided to selectively control the pressure of the gas in the mold, the hot resin is injected into the mold cavity, the gas is stored at a first storage pressure as determined by said control means, the gas at said first storage pressure is reduced to a second lower pressure as determined by said control means, the gas is injected into the mold at said second lower pressure, the mold cavity is filled out with resin, the gas pressure is reduced to a third lower hold pressure as determined by said control means, the gas pressure is thereafter maintained by said control means substantially at said third lower hold pressure, and the gas is thereafter vented before the mold is opened.

2. A method according to claim 1 wherein the process includes a portion during which the injected gas acts to fill out the mold cavity with resin and wherein the gas pressure is substantially maintained by said control means at said second lower pressure during the fill out portion whereafter it is reduced by said control means to said third lower hold pressure.

3. A method according to claim 1 wherein the process includes a portion during which the injected gas acts to fill out the mold cavity with resin and wherein the injected gas pressure is reduced from said second lower pressure to said third lower hold pressure during said fill out portion.

4. A method according to claim 1 wherein the process includes a portion during which the injected gas acts to fill out the mold cavity with resin and wherein the injected gas pressure is reduced during the fill out portion from said second lower pressure to a fourth pressure higher than said third hold pressure and is thereafter reduced to said third hold pressure.

5. A method of providing gas assistance to a resin injection molding process of the type in which hot resin is injected into a mold cavity and gas is injected into the resin to fill out the mold cavity with resin, the improvement wherein a supply of stored gas is provided, the gas is injected into the mold, to fill out the mold cavity, at a pressure that is at all times during the gas injection cycle substantially below the pressure of the stored gas supply; and the gas pressure within the mold is thereafter reduced to a lower hold pressure and held substantially at that pressure until the mold is vented to allow removal of the molded part.

6. A method according to claim 5 wherein the gas for injection into the mold is stored as a fixed volume at a pressure less than the pressure of the stored gas supply.

7. A method according to claim 5 wherein a bulk storage of gas is provided and the bulk gas is boosted to said stored gas supply pressure.

8. A method of gas assisted injection molding comprising the steps of:
providing a supply of stored gas at a first pressure;
injecting the resin into a mold cavity;
injecting the stored gas into the mold at a second pressure lower than said first pressure to fill out the mold cavity with resin while maintaining said supply of stored gas at a pressure exceeding said second pressure at all times during the gas injection cycle;
reducing the gas pressure within the mold to a third pressure;
while the resin is still cooling maintaining the gas pressure within the mold at substantially said third pressure; and
thereafter venting the mold.

9. A method of molding according to claim 8 wherein said supply of stored gas at said first pressure is provided by providing a bulk supply of gas at a relatively low pressure and boosting the pressure of the bulk gas supply to said first pressure.

10. A method according to claim 8 wherein said gas pressure is reduced to said third pressure upon completion of the fill out portion of the mold cycle.

11. A method according to claim 8 wherein the gas pressure is reduced to said third pressure during the fill out portion of the mold cycle.

12. A method according to claim 8 wherein the gas pressure is reduced from said second pressure to a fourth pressure, greater than said third pressure, during the fill out portion of the mold cycle and is thereafter reduced to said third pressure.

13. A method of providing gas assistance to a resin injection molding process comprising the steps of:
storing gas in bulk at a first pressure;
boosting the gas pressure from the first bulk pressure to a second higher pressure and storing the gas at said second higher pressure;
injecting resin into a mold;
injecting the gas into the mold at a third pressure to fill out the mold cavity with resin, the third pressure being lower than the second pressure, and the second pressure being maintained higher than the third pressure at all times during the gas injection cycle;
reducing the third pressure to a fourth pressure;
relieving the pressure within the mold; and
opening the mold to remove the molded article.

14. A method according to claim 13 and including the further step of maintaining said gas at substantially said fourth pressure during a portion of the cycle remaining after the mold has been filled out with resin.

15. A method of providing gas assistance to a resin injection molding process comprising the steps of:
storing gas at a first bulk pressure;
boosting said bulk pressure to a second higher pressure;
storing the gas at the second higher pressure;
storing a fixed volume of the gas at a third pressure lower than said second pressure:
injecting resin into the mold cavity;
injecting said fixed volume of gas at said third pressure into said mold so that said gas pressure falls as the fixed volume of gas moves into the mold to fill out the mold cavity;
maintaining said gas pressure at a fourth pressure;
thereafter venting the mold to relieve the gas pressure; and
thereafter opening said mold to remove the molded part.

16. A method according to claim 15 wherein the gas pressure is reduced from said third pressure to a fifth pressure higher than said fourth pressure during the fill out portion of the mold cycle and is thereafter reduced to said fourth pressure.

17. A method according to claim 15 wherein said gas pressure falls to said fourth pressure as the fixed volume of gas moves into the mold to fill out the mold cavity and said gas pressure is thereafter maintained substantially at said fourth pressure.

18. A method of providing gas assistance to a resin injection molding process of the type in which hot resin is injected into a mold cavity, gas is injected into the resin to fill out the mold cavity, the resin cools during a cooling cycle, the gas is vented, and the mold is opened to remove the molded part, the improvement wherein the hot resin is injected into the mold cavity, the gas is stored at a first relatively high pressure, the stored gas pressure is reduced to a second lower gas pressure, the gas is injected into the mold at said second lower pressure, the gas is substantially maintained at said second lower pressure during the fill out portion of the mold cycle, the gas pressure is thereafter reduced to a third hold pressure lower than said second lower pressure, and the gas pressure is thereafter maintained substantially at said third hold pressure until the mold is vented.

19. A method according to claim 1 including the further steps of sensing a condition of the resin and varying the magnitude of said second lower pressure in response to sensed changes in said resin condition.

20. A method according to claim 19 wherein said resin condition is the resin temperature.

21. A method according to claim 6 including the further steps of sensing a condition of the resin and varying the magnitude of the stored fixed volume of gas in response to sensed changes in said resin condition.

22. A method according to claim 21 wherein said resin condition is the resin temperature.

23. A method according to claim 6 including the further steps of sensing a condition of the resin and varying the pressure of the stored fixed volume of gas in response to sensed changes in said resin condition.

24. A method according to claim 23 wherein said resin condition is the resin temperature.

25. A method according to claim 8 and including the further steps of sensing the condition of the resin and varying the magnitude of said second pressure in response to sensed changes in said resin condition.

26. A method according to claim 25 wherein said resin condition is the resin temperature.

27. A method according to claim 15 and including the further steps of sensing the condition of the resin and varying the magnitude of said fixed volume of gas in response to sensed changes int he resin condition.

28. A method according to claim 15 and including the further steps of sensing a condition of the resin and varying the magnitude of said third pressure in response to sensed changes in said resin condition.

29. A method of molding according to claim 8 wherein said second pressure is maintained substantially constant during the fill out portion.

* * * * *